US011413703B2

(12) United States Patent
Hendricks et al.

(10) Patent No.: US 11,413,703 B2
(45) Date of Patent: Aug. 16, 2022

(54) METHOD OF FORMING COOLING HOLES

(71) Applicant: General Electric Company, Schenectady, NY (US)

(72) Inventors: Kathleen Lombard Hendricks, Bedford, MA (US); Richard Bryan Guiney, Maineville, OH (US); Lenin Ramasamy Ramachandran, Arlington, MA (US); Brian James Crockett, South Palmer, IN (US); Anthony S. Urbanski, Terre Haute, IN (US); Brenda Catherine Tenley, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 581 days.

(21) Appl. No.: 16/419,215

(22) Filed: May 22, 2019

(65) Prior Publication Data
US 2020/0370437 A1 Nov. 26, 2020

(51) Int. Cl.
| | |
|---|---|
| B23K 26/03 | (2006.01) |
| B23K 26/55 | (2014.01) |
| B23K 26/382 | (2014.01) |
| B23P 15/02 | (2006.01) |
| B23K 37/04 | (2006.01) |
| F01D 5/18 | (2006.01) |

(Continued)

(52) U.S. Cl.
CPC .......... *B23K 26/032* (2013.01); *B23K 26/382* (2015.10); *B23K 26/389* (2015.10); *B23K 26/55* (2015.10); *B23K 37/0443* (2013.01); *B23P 15/02* (2013.01); *B23K 2101/001* (2018.08); *B23P 2700/06* (2013.01); *F01D 5/186* (2013.01); *F01D 25/12* (2013.01); *F05D 2220/32* (2013.01); *F05D 2260/202* (2013.01)

(58) Field of Classification Search
CPC ...... B23P 15/02; B23P 2700/06; B23K 26/55; B23K 26/382; B23K 26/389; B23K 26/032; B23K 2101/001; F05D 2260/81; F05D 2260/202; F05D 2240/11; F05D 2220/32; F01D 5/186; F01D 25/12
See application file for complete search history.

(56) References Cited

U.S. PATENT DOCUMENTS

| | | | |
|---|---|---|---|
| 5,125,035 A | 6/1992 | McGarthy et al. | |
| 5,773,790 A | 6/1998 | Moore et al. | |

(Continued)

FOREIGN PATENT DOCUMENTS

| | | |
|---|---|---|
| CN | 1602236 A | 3/2005 |
| CN | 1602236 A | 3/2005 |

(Continued)

*Primary Examiner* — John J Norton
(74) *Attorney, Agent, or Firm* — McGarry Bair PC

(57) ABSTRACT

An apparatus and method regarding forming a cooling hole in a component for a turbine engine, with the component held in a hole-forming machine with a laser carried on a multi-axis carriage and defining an optical path, the method comprising forming a set of cooling holes in the component with a laser mounted to the multi-axis carriage, estimating a total airflow through the set of cooling holes based on a set of data regarding the flow effectiveness of the set of cooling holes, and forming a second set of cooling holes with the laser.

20 Claims, 4 Drawing Sheets

(51) Int. Cl.
*F01D 25/12* (2006.01)
*B23K 101/00* (2006.01)

(56) References Cited

U.S. PATENT DOCUMENTS

| | | | |
|---|---|---|---|
| 6,339,208 B1* | 1/2002 | Rockstroh | B23K 26/03 |
| | | | 219/121.71 |
| 6,380,512 B1 | 4/2002 | Emer | |
| 6,909,800 B2 | 6/2005 | Vaidyanathan | |
| 7,096,744 B2 | 8/2006 | Kielb et al. | |
| 7,329,832 B2 | 2/2008 | Hoebel et al. | |
| 7,333,218 B2 | 2/2008 | Vaidyanathan | |
| 8,525,073 B2 | 9/2013 | Quitter et al. | |
| 9,403,245 B2 | 8/2016 | Arjakine et al. | |
| 9,415,468 B2 | 8/2016 | Hu et al. | |
| 9,707,645 B2 | 7/2017 | Ozturk et al. | |
| 2002/0150468 A1* | 10/2002 | Tiemann | F01D 5/187 |
| | | | 415/115 |
| 2005/0284236 A1* | 12/2005 | Kielb | G01F 1/42 |
| | | | 73/861.42 |
| 2009/0248355 A1* | 10/2009 | Kriegmair | B23K 26/389 |
| | | | 702/155 |
| 2014/0115892 A1* | 5/2014 | Bezdecny | G01M 13/00 |
| | | | 29/889.721 |
| 2016/0279738 A1* | 9/2016 | Yoshida | G01B 11/08 |
| 2017/0132775 A1* | 5/2017 | Ramamurthy | G06K 9/6202 |
| 2017/0206303 A1* | 7/2017 | Burkett | F01D 21/003 |
| 2017/0261208 A1 | 9/2017 | Starkweather et al. | |
| 2020/0326180 A1* | 10/2020 | Campion | G01B 11/005 |

FOREIGN PATENT DOCUMENTS

| | | |
|---|---|---|
| CN | 101040167 A | 9/2007 |
| CN | 101040167 A | 9/2007 |
| CN | 104131900 A | 11/2014 |
| CN | 104131900 A | 11/2014 |
| CN | 105458530 A | 4/2016 |
| CN | 105705290 A | 6/2016 |
| CN | 105705290 A | 6/2016 |

\* cited by examiner

METHOD OF FORMING COOLING HOLES

TECHNICAL FIELD

This disclosure generally relates to cooling holes in engine components, and more particularly to a method of forming such holes.

BACKGROUND

Cooling holes are formed in gas turbine components such as vanes, blades and shrouds for transporting film cooling air through the component to cool the component and to form a fluid barrier between the component and hot gases traveling through a main flowpath of the engine. Frequently, these cooling holes are formed by aiming a laser at a selected point on the component to form a hole through the component. The laser is then aimed at another selected point on the component to form another hole in the component. This process is repeated to form all the cooling holes in the component.

Cooling holes formed by lasers can provide varying amounts of cooling flow during operation of the gas turbine. Determining the amount of cooling flow each cooling hole provides is necessary for enabling optimal performance of the engine component in which the cooling holes are formed.

BRIEF DESCRIPTION

In one aspect, the disclosure relates to a method of closed loop forming a cooling hole in a component for a turbine engine, with the component held in place by a hole-forming machine, the method comprising forming a first set of cooling holes in the component, using a sensor controlled by the hole-forming machine, capturing an image of each cooling hole within the first set of cooling holes to create a set of image data, obtaining a set of cross-sectional area data, comprising processing the set of image data to determine a cross-sectional area for the cooling holes in the first set of cooling holes with an image processing program residing in a processor of the hole-forming machine, estimating a total airflow through the first set of cooling holes based on the set of cross-sectional area data, adjusting at least one operational parameter based on the estimated total airflow, and after the adjusting, forming a second set of cooling holes.

In another aspect, the disclosure relates to a method of determining an airflow through a set of cooling holes, the method comprising capturing an image of each cooling hole within the set of cooling holes to create a set of image data, obtaining a set of cross-sectional area data, including processing the set of image data to determine a cross-sectional area for the cooling holes in the set of cooling holes with an image processing program, and estimating a total airflow through the set of cooling holes based on the set of cross-sectional area data.

In yet another aspect, the disclosure relates to a hole-forming machine comprising a jig configured to hold a component in which a pattern of cooling holes is to be formed, a multi-axis carriage moveable about multiple axes relative to the jig, a hole-forming tool carried by the multi-axis carriage and defining an optical path, a sensor carried by the multi-axis carriage and outputting at least one image for the cooling holes, and a controller operably controlling the multi-axis carriage, hole-forming tool, and sensor to form the cooling holes based a predetermined cooling hole pattern for the component, the controller comprising a processor having access to the cooling hole pattern, an image processing program to determine a cross-sectional area of the cooling holes in the cooling hole, and an airflow estimating program to estimate a total airflow through a sub-set of the cooling holes in the cooling hole pattern based on the determined cross-sectional area.

DETAILED DESCRIPTION

Figure 1:
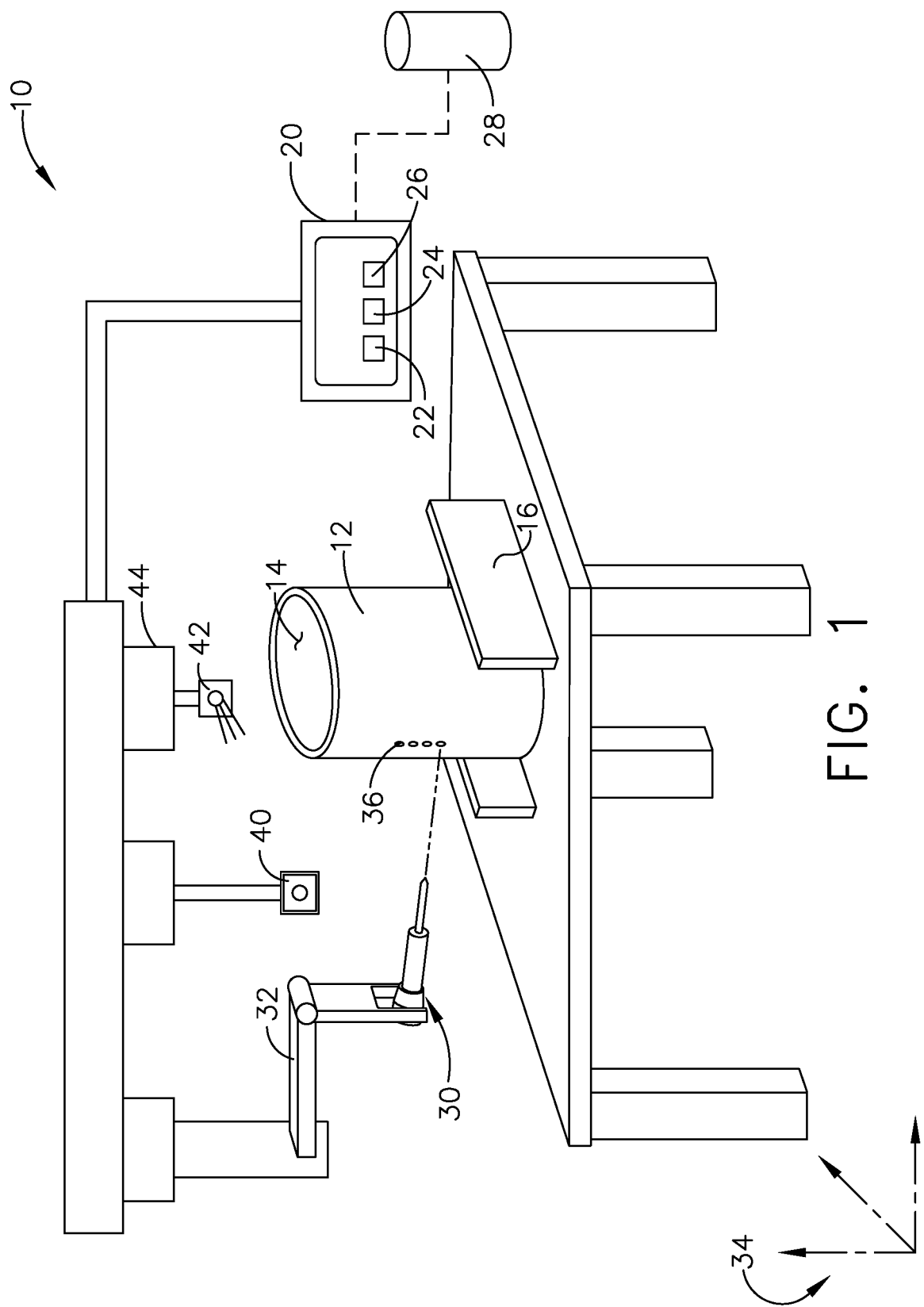
FIG. 1 is a schematic diagram of a laser processing machine.

Aspects of the present disclosure are directed to a cooled component. For the purposes of description, the cooled component will be described as a cooled turbine engine component, such as a cooled airfoil. It will be understood that the disclosure may have general applicability for any engine component, including turbines and compressors and non-airfoil engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

Additionally, as used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic diagram of a hole-forming machine, by way of non-limiting example a laser processing machine 10. A component 12 defining an interior 14 can be secured by a jig 16 to the laser processing machine 10 which can be by way of non-limiting example a LASERDYNE® by Prima Power in Champlin, Minn. machine. For clarity all the components of the laser processing machine 10 are illustrated without a housing. It should be understood that all the components shown can be located within a housing. It should be further appreciated that laser processing machines are known in the art and that the entire process described herein can take place within/on the laser processing machine 10. Further, it should be appreciated that other equipment/ machines can be utilized without departing from the scope of the disclosure described herein. The hole-forming machine as described herein can be a machine for forming holes using water jet machining, electron beam hole-making, or additive manufacturing processes and is therefore not limited to a laser processing machine.

A computer processing unit (CPU) 20 controls the laser processing machine 10. The CPU 20 can include a controller 22 for controlling the operation of various parts of the laser processing machine 10, and managing and processing software, referred to herein as the manager 24 and the processor 26, for capturing, collecting, and evaluating images collected during operation. It is further contemplated that a database 28 for storing information is in communication with the CPU 20. The manager 24 can retrieve information from the database 28 during operation as needed and initiate the processor 26 to evaluate captured data for comparison with the retrieved information. The manager 24 can relay retrieved information to the controller for operation of different components of the laser processing machine 10. The database 28 can be part of the CPU 20 or located externally of the CPU 20 or externally of the laser processing machine all together. In some implementations the database 28 can be connected to the CPU 20 within an internal network or located remotely and accessible for read/write over external network, by way of non-limiting example the internet.

A hole-forming tool, by way of non-limiting example referred herein to as a laser 30, can be mounted to a multi-axis carriage 32 of the laser processing machine 10. The multi-axis carriage enables three dimensional movement through axes 34 illustrated in dashed line. The laser 30 can be a conventional laser. The controller 22 delivers operating instructions to the multi-axis carriage 32 based on input from the manager 24 depending on part specific dimensions, by way of non-limiting example cooling hole information stored in the database 28. At least one cooling hole 36 can be formed in the component 12 using the laser 30.

A sensor 40 can also be located within the laser processing machine 10 and can be operational in multiple directions along axes 34. The sensor 40 can be a camera, a laser displacement sensor, an x-ray, a tactile sensor, or the like. The sensor as described herein will be described as a camera for exemplary purposes and is not meant to be limiting. The sensor 40 can be in communication with the CPU 20, more particularly with the controller 22 for controlling movement of the sensor 40 along the axes 34. Images of the at least one cooling hole 36 can be taken with the sensor 40 and stored in the CPU 20, more particularly in the processor 26 for processing.

A light 42 can be selectively placed within the interior 14 of the component 12 to illuminate the at least one cooling hole 36 from an interior location. The light 42 can be a backlight located on a side opposite the sensor 40 with respect to component 12. The light 42 can be in communication with the CPU 20, more particularly with the manager 24 for managing the on/off status of the light 42. The on/off status of the light 42 can be synchronized with when images are being captured by the sensor 40. The light 42 can also be capable of automated movement controlled by a light controller 44 in communication with the manager 24. The light controller 44 can control movement of the light along the axes 34. The light controller 44 can be located within the CPU 20 or separate from the CPU 20 as illustrated.

It will be appreciated that the component and jig may together be movable about any of the three axes 34 for positioning relative to the laser, light and/or sensor. In this case, the jig may be mounted on an actuator controlled by controller 22.

Figure 2:
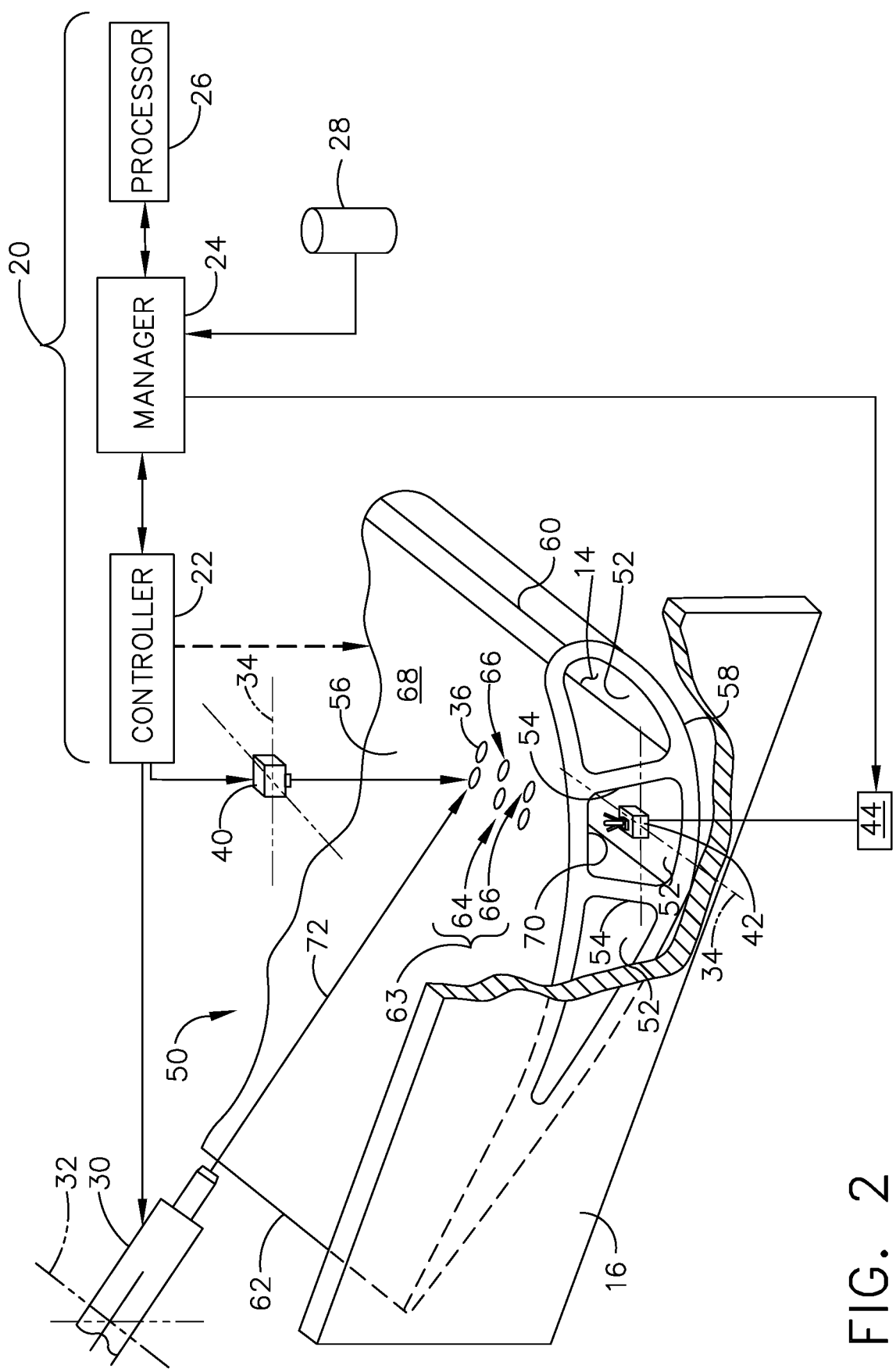
FIG. 2 is an enlarged view of the laser processing machine of FIG. 1 with an engine component, computer processing unit (CPU), laser, and sensor along with at least one cooling hole formed by the laser.

FIG. 2 is a more detailed enlarged view of a portion of the laser processing machine 10 from FIG. 1. An exemplary component, by way of non-limiting example an engine component illustrated as a vane 50 where the interior 14 is separated into internal passages or cavities 52 separated by walls 54, is illustrated as secured to the laser processing machine 10 by the jig 16. It should be understood that the vane 50 can be any engine component having cooling holes 36 such as combustor liners, blades, and shrouds, and that the vane 50 illustrated is for exemplary purposes only and not meant to be limiting. The vane 50 can include a concave-shaped pressure side 56 and a convex-shaped suction side 58 which are joined together to define an airfoil shape extending between a leading edge 60 and a trailing edge 62. A pattern of cooling holes 63 including the at least one cooling hole 36 can be located on the pressure side. By way of non-limiting example the pattern of cooling holes 63 can include a first and second set of cooling holes 64, 66 each formed in a line as illustrated. The at least one cooling hole 36 extends between a first surface 68 defined by the pressure side 56 and a second surface 70 opposite the first surface 68 defining, in part, the internal passages 52. Although only two sets of cooling holes 64, 66, illustrated as rows, are shown in FIG. 2, it should be appreciated that the pattern of cooling holes 63 can include more sets of cooling holes 64, 66. The number, sizes, positioning and orientations of the at least one cooling hole 36 are determined based upon the desired cooling airflow characteristics of the vane 50. Part information about the at least one cooling hole 36 can be stored in the database 28.

To form the pattern of cooling holes 63, the vane 50 is loaded onto the jig 16 located within the laser processing machine 10. The controller 22 translates and rotates the laser 30 and/or optionally, as illustrated in dashed line, the vane 50 into the correct location for forming the at least one cooling hole 36. The controller 22 opens a shutter (not shown) inside the laser 30 and a laser pulse train or beam 72 emits from the laser. The beam 72 is aimed at the component 12 to form the at least one cooling hole 36. The sensor 40 can be moved along three axes 34 into and out of the path of the beam 72 of the laser 30 for capturing images of the at least one cooling hole 36.

After the at least one cooling hole 36 is formed, the controller 22 translates and rotates the laser 30 and/or the component 12 into the correct location for forming a subsequent at least one cooling hole 36 in the first set of cooling holes 64 and the process is repeated. As will be appreciated by those skilled in the art, the laser 30 may be stopped during the formation of the second and subsequent holes after the measured parameter reaches a preselected value or after a period of time related to (e.g., equal to) the amount of time taken to form the first hole.

Figure 3:
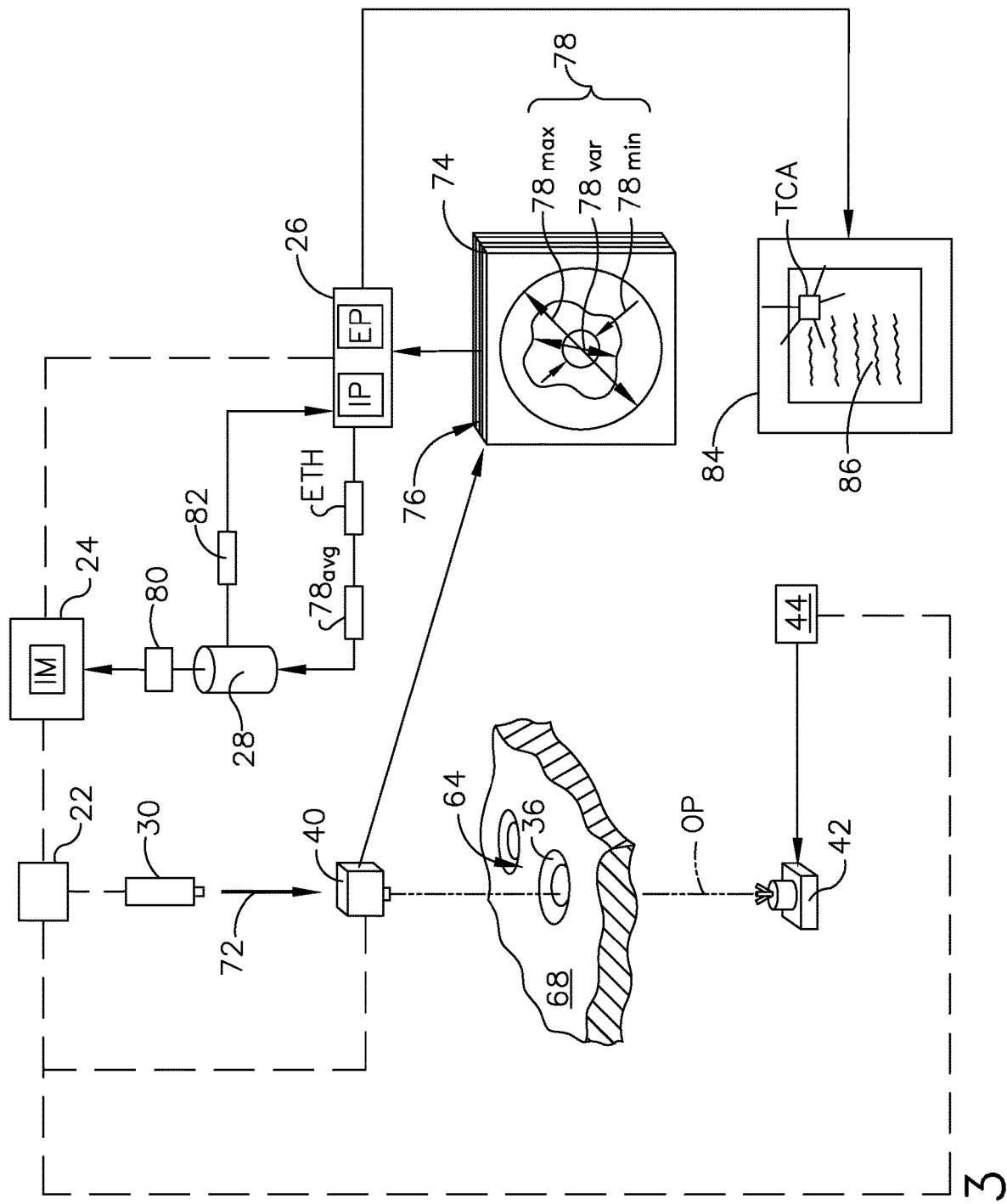
FIG. 3 is schematic diagram of a portion of the engine component illustrating an optical path for the sensor and the communication connections between the sensor, the laser, and the CPU along with an image taken of the at least one cooling hole by the sensor.

Turning to FIG. 3, it can more clearly be seen that the laser 30, the light 42, and the sensor 40 can be oriented along an optical path (OP) passing through the at least one cooling hole 36. After the at least one cooling hole 36 is formed, the controller 22 can move the laser 30 out of the optical path (OP) and the sensor 40 into the optical path (OP). It is further contemplated that the laser 30 is simply shut off and the sensor 40 is moved into the optical path (OP). The controller 22 triggers the sensor 40 to capture at least one image 74 of the at least one cooling hole 36. The image 74 can be part of multiple images taken of multiple cooling holes 36 within the first set of cooling holes 64. The complete set of images forms a set of image data 76 representative of the first set of cooling holes 64.

Simultaneous to aligning the sensor 40 with the at least one cooling hole 36, the manager 24 can send a signal to the light controller 44 to illuminate the light 42. The sensor 40 can be oriented in a position such that light emitted passes through the at least one cooling hole 36 to illuminate the at least one cooling hole 36. The controller 44 can also position the light directly below the at least one cooling hole 36 when the image 74 is being captured and out of the way of the laser beam 72 when the laser 30 is in use. A captured image 74 of the at least one cooling hole 36 includes a minimum cross-sectional area $78_{min}$, a maximum cross-sectional area $78_{max}$, and variable cross-sectional areas $78_{var}$ therebetween. Each of the minimum cross-sectional area $78_{min}$, maximum cross-sectional area $78_{min}$, and variable cross-sectional area $78_{var}$ can be determined based on shadows on the image where the minimum cross-sectional area $78_{min}$ can be an oval shape most brightly illuminated by the light 42, the maximum cross-sectional area $78_{max}$ can be the darkest and largest shape with light being blocked from hitting all of its surfaces, while the variable cross-sectional area $78_{var}$ can be a gray area where some light illuminates it but not as much light as can be seen through the minimum cross-sectional area $78_{min}$. A single captured image 74 can produce enough value, resolution and clarity to reliably collect the required information, however processing multiple images of the same hole to achieve the same measurement for the minimum cross-sectional area $78_{min}$, maximum cross-sectional area $78_{max}$, and variable cross-sectional areas $78_{var}$ is also contemplated.

The manager 24 can include an image manager (IM) program for regulating exposure, gain, and focus of the sensor 40 in order to capture the image 74. Part specific programs including operational parameters 80 that can include one of or all of the following information related to part names, row location, hole sizes, focus offsets, airflow circuitry, estimated airflow, and recommendations for airflow can be stored in the database 28 and can be used to initiate the (IM) program. The operational parameter 80 can be the size of the cross-sectional area for a sequential set of cooling holes, by way of non-limiting example the second set of cooling holes 66. Upon capturing the set of image data, the (IM) program can initiate an image processing (IP) program in the processor 26.

The (IP) program can be used for interpreting the captured image 74. Illuminating the at least one cooling hole 36 enhances the ability to process and evaluate the set of image data 76. More specifically the (IP) program can determine values for the minimum cross-sectional area $78_{min}$ and the maximum cross-sectional area $78_{max}$ and using those values calculate a set of cross-sectional area data 78 which can include an average cross-sectional area $78_{avg}$. The average cross-sectional area $78_{avg}$ can be compared with a reference cross-sectional area 82 retrieved from the database 28.

Using the cross-sectional area data 78, an airflow estimating program (EP) located within the processor 26 can determine an estimated total airflow (ETA) through the first set of cooling holes 64. The (ETA) can also be indexed with the reference cross-sectional area 82 stored in the database 28. Further, during the formation of the first set of holes 64, an (ETA) associated with the previously formed holes can be used to determine the preselected parameter for forming the next few holes. For instance, if the (ETA) through the first two holes is slightly below nominal, the preselected value of the parameter used for forming the next three holes may be adjusted slightly upward so the total flow through all five holes is nominal.

Based on the (ETA) for the first set of cooling holes 64, the operational parameter 80 for the part can be adjusted. Adjustment of the operational parameter 80 in combination with the (ETA) for the first set of cooling holes 64 will achieve a predetermined total cooling air (TCA) flow in the component 12. The predetermined (TCA) flow is the designed airflow for the component 12 in the laser processing machine. It can be displayed on a user interface 84 along with other data 86 collected and calculated that can include, but is not limited to, an average hole area, an effective pin size, and laser parameter changes necessary for producing the next sequential, or second set of cooling holes 66. In the event the predetermined (TCA) flow is achieved, an indication, such a light or sound can emit from the user interface 84.

The (IP), (EP), and (IM) programs as used herein are terms generally used to indicate a program initiated by or run with, by way of non-limiting example, a computer. The (IP) program as described herein can utilize algorithms to perform image processing on images collected by the sensors as described herein. The (EP) as described herein can also utilized algorithms to perform analysis of the images and determine the flow through holes captured within these images. The (IM) program as described herein can be utilized to manage the initial image intake and in turn actuate the (IP) program.

Figure 4:
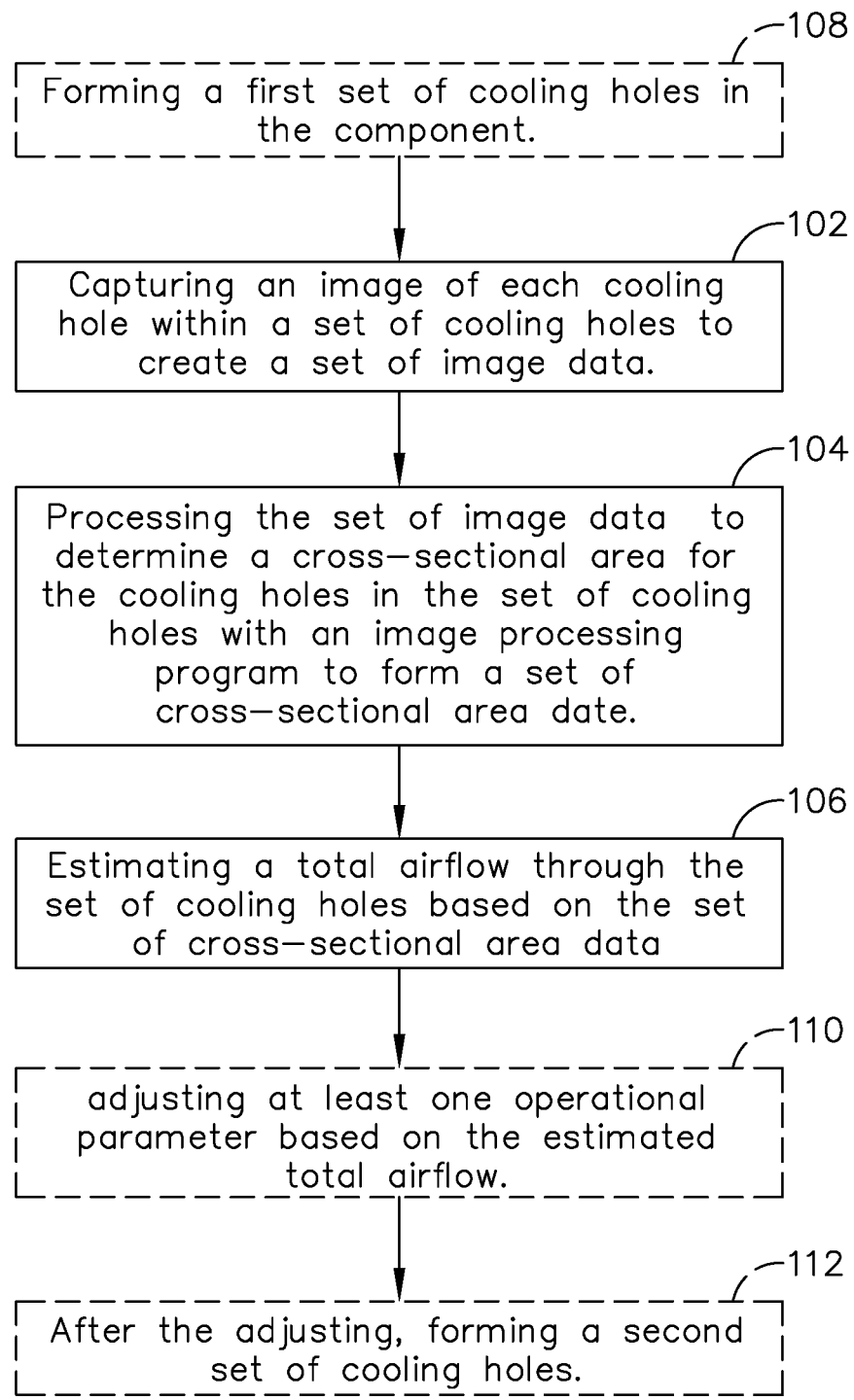
FIG. 4 is a flow diagram illustrating a method for forming a set of cooling holes with the laser processing machine of FIG. 1 with optional stages in the process shown in phantom.

FIG. 4 illustrates a flow chart for a method of determining an airflow through a set of cooling holes, by way of non-limiting example the first set of cooling holes 64. Additional stages 108, 110, and 112 of the method 100 are illustrated in phantom. The method 100 includes at 102 capturing an image 74, by way of non-limiting example with the sensor 40 or more specifically a camera, of each cooling hole 36 within the set of cooling holes 64 to create the set of image data 76. At 104 processing the set of image data 76 to determine the cross-sectional area $78_{max}$, $78_{var}$, $78_{min}$ for the cooling holes 36 in the set of cooling holes 64 with the (IP) program to form a set of cross-sectional area data 78. Processing can include determining the average cross-sectional area $78_{avg}$. At 106 the processor can further be used to establish, by estimating a total airflow, the (ETA) through the set of cooling holes 64 based on the cross-sectional area data 78.

Based on the (ETA), at 110 the method 100 can include adjusting at least one operational parameter 80 based on the (ETA). Depending on the (ETA) of the first set of cooling holes 64, the size of the cross-sectional area for the second set of cooling holes 66 can be bigger, smaller, or the same in the event the operational parameter 80 is the cross-sectional area for the second set of cooling holes 66. After the adjusting, at 112 the method includes forming the second set of cooling holes 66, by way of non-limiting example with the laser 30.

The method 100 can be apart of a method for closed loop forming the at least one cooling hole 36 described herein. The closed loop can be defined as a communication loop between the manager 24, processor 26, and sensor 40 that enables processing as the at least one cooling hole 36 is formed. In other words, the closed loop is a feedback or adaptive control of laser movement as the hole is being formed so that if the hole is not being formed correctly laser control is updated while ablation is taking place. Information gathered within the closed loop enables adjustment and/or quick reprocessing while the component 12 is still on the laser processing machine 10. Prior to determining the airflow, the method 100 can include at 108 forming the set of cooling holes 64 in the component 12 with the laser 30.

Benefits associated with closed loop forming the at least one cooling hole 36 as described herein include reduction of cycle time, rework time, and total cost. Inspection is streamlined rather than manually checking each hole with a pin. The process is both accurate and precise and in the event rework is necessary, it can be performed while the part is still on machine. The utilization of a sensor and light together enable hole sizes to be targeted closer to nominal for improved design intent.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

ASPECTS

Various characteristics, aspects, and advantages of the present disclosure may also be embodied in the following technical solutions as defined by the clauses:

1. A method of closed loop forming a cooling hole in a component for a turbine engine, with the component held in place by a hole-forming machine, the method comprising:
   forming a first set of cooling holes in the component;
   using a sensor controlled by the hole-forming machine, capturing an image of each cooling hole within the first set of cooling holes to create a set of image data;
   obtaining a set of cross-sectional area data, comprising processing the set of image data to determine a cross-sectional area for the cooling holes in the first set of cooling holes with an image processing program residing in a processor of the hole-forming machine;
   estimating a total airflow through the first set of cooling holes based on the set of cross-sectional area data;
   adjusting at least one operational parameter based on the estimated total airflow; and after the adjusting, forming a second set of cooling holes.

2. The method of aspect 1 further comprising forming the first and second set of cooling holes with a laser carried on a multi-axis carriage and defining an optical path.

3. The method of aspect 2 wherein the capturing the image of each cooling hole comprises illuminating the cooling hole while capturing the image.

4. The method of aspect 3 wherein the illuminating the cooling hole comprises aligning a backlight along the optical path.

5. The method of aspect 1 wherein the estimating a total air flow comprises calculating an average cross-sectional area for the set of cooling holes.

6. The method of aspect 5 wherein the estimating a total air flow comprises comparing the average cross-sectional area to a reference average cross-sectional area.

7. The method of aspect 6 wherein a size of the cross-sectional area of the second set of cooling holes in combination with the cross-sectional area data is selected to achieve a predetermined total cooling air flow through the first and second set of cooling holes.

8. A method of determining an airflow through a set of cooling holes, the method comprising:
   capturing an image of each cooling hole within the set of cooling holes to create a set of image data;
   obtaining a set of cross-sectional area data, including processing the set of image data to determine a cross-sectional area for the cooling holes in the set of cooling holes with an image processing program; and
   estimating a total airflow through the set of cooling holes based on the set of cross-sectional area data.

9. The method of aspect 8 further comprising adjusting at least one operational parameter for forming an additional set of cooling holes based on the estimated total airflow.

10. The method of aspect 9 further comprising comparing the estimated total airflow to a predetermined total cooling airflow associated with a designed airflow for a component in which the set of cooling holes and the additional set of cooling holes are formed.

11. A hole-forming machine comprising:
 a jig configured to hold a component in which a pattern of cooling holes is to be formed;
 a multi-axis carriage moveable about multiple axes relative to the jig;
 a hole-forming tool carried by the multi-axis carriage and defining an optical path;
 a sensor carried by the multi-axis carriage and outputting at least one image for the cooling holes; and
 a controller operably controlling the multi-axis carriage, hole-forming tool, and sensor to form the cooling holes based a predetermined cooling hole pattern for the component, the controller comprising a processor having access to the cooling hole pattern, an image processing program to determine a cross-sectional area of the cooling holes in the cooling hole, and an airflow estimating program to estimate a total airflow through a sub-set of the cooling holes in the cooling hole pattern based on the determined cross-sectional area.

12. The hole-forming machine of aspect 11 wherein the controller is configured to adjust at least one operational parameter based on the estimated total airflow prior to the completion of forming the cooling holes in the cooling hole pattern.

13. The hole-forming machine of aspect 11 further comprising a light for aligning with the cooling holes to illuminate the cooling hole when capturing the at least one image.

14. The hole-forming machine of aspect 12 wherein the light is positioned on a side of the component opposite the sensor.

15. The hole-forming machine of aspect 11 further comprising a computer processing unit including the controller, the processor, and a manager for regulating the sensor.

16. The hole-forming machine of aspect 15 wherein the computer processing unit is in communication with a database.

17. The hole-forming machine of aspect 16 wherein the database stores part information associated with the cooling hole.

18. The hole-forming machine of aspect 16 wherein the database stores the pattern of cooling holes.

19. The hole-forming machine of aspect 16 wherein the database stores at least one operational parameter.

20. The hole-forming machine of aspect 19 wherein the at least one operational parameter is a size of a cross-sectional area for a sequential set of cooling holes.

What is claimed is:

1. A method of closed loop forming a cooling hole in a component for a turbine engine, with the component held in place by a hole-forming machine, the method comprising:
 forming a first set of cooling holes in the component;
 using a sensor controlled by the hole-forming machine, capturing an image of each cooling hole within the first set of cooling holes to create a set of image data;
 obtaining a set of cross-sectional area data, comprising processing the set of image data to determine a cross-sectional area for the cooling holes in the first set of cooling holes with an image processing program residing in a processor of the hole-forming machine;
 estimating a total airflow through the first set of cooling holes based on the set of cross-sectional area data;
 adjusting at least one operational parameter based on the estimated total airflow; and
 after the adjusting, forming a second set of cooling holes.

2. The method of claim 1 further comprising forming the first and second set of cooling holes with a laser carried on a multi-axis carriage and defining an optical path.

3. The method of claim 2 wherein the capturing the image of each cooling hole comprises illuminating the cooling hole while capturing the image.

4. The method of claim 3 wherein the illuminating the cooling hole comprises aligning a backlight along the optical path.

5. The method of claim 1 wherein the estimating a total air flow comprises calculating an average cross-sectional area for the first set of cooling holes.

6. The method of claim 5 wherein the estimating a total air flow comprises comparing the average cross-sectional area to a reference average cross-sectional area.

7. The method of claim 6 wherein a size of the cross-sectional area of the second set of cooling holes in combination with the cross-sectional area data is selected to achieve a predetermined total cooling air flow through the first and second set of cooling holes.

8. A hole-forming machine comprising:
 a jig configured to hold a component in which a pattern of cooling holes is to be formed;
 a multi-axis carriage moveable about multiple axes relative to the jig;
 a hole-forming tool carried by the multi-axis carriage and defining an optical path;
 a sensor carried by the multi-axis carriage and outputting at least one image for the cooling holes; and
 a controller operably controlling the multi-axis carriage, hole-forming tool, and sensor to form the cooling holes based on a predetermined cooling hole pattern for the component, the controller comprising a processor having access to the cooling hole pattern, an image processing program to determine a cross-sectional area of the cooling holes in the cooling hole pattern, and an airflow estimating program to estimate a total airflow through a sub-set of the cooling holes in the cooling hole pattern based on the determined cross-sectional area.

9. The hole-forming machine of claim 8 wherein the controller is configured to adjust at least one operational parameter based on the estimated total airflow prior to the completion of forming the cooling holes in the cooling hole pattern.

10. The hole-forming machine of claim 8 further comprising a light for aligning with the cooling holes to illuminate the cooling hole when capturing the at least one image.

11. The hole-forming machine of claim 10 wherein the light is positioned on a side of the component opposite the sensor.

12. The hole-forming machine of claim 8 further comprising a computer processing unit including the controller, the processor, and a manager for regulating the sensor.

13. The hole-forming machine of claim 12 wherein the computer processing unit is in communication with a database.

14. The hole-forming machine of claim 13 wherein the database stores part information associated with the cooling hole.

15. The hole-forming machine of claim 13 wherein the database stores the pattern of cooling holes.

16. The hole-forming machine of claim 13 wherein the database stores at least one operational parameter.

17. The hole-forming machine of claim 16 wherein the at least one operational parameter is a size of a cross-sectional area for a sequential set of cooling holes.

18. A method of forming a pattern of cooling holes, the method comprising:
   forming a first set of cooling holes to define at least a portion of the pattern of cooling holes;
   capturing an image of each cooling hole in the first set of cooling holes to create a set of image data;
   obtaining a set of cross-sectional area data, including processing the set of image data to determine a cross-sectional area of each cooling hole in the first set of cooling holes with an image processing program;
   estimating a total airflow through the first set of cooling holes based on the set of cross-sectional area data;
   determining a preselected parameter associated with the estimated total airflow; and
   forming an additional cooling hole in the pattern of cooling holes with the preselected parameter.

19. The method of claim 18 further comprising adjusting at least one operational parameter before forming the additional cooling hole based on the estimated total airflow.

20. The method of claim 19 further comprising achieving a predetermined total cooling airflow associated with a designed airflow for a component in which the pattern of cooling holes is formed.

* * * * *